United States Patent Office 3,730,920
Patented May 1, 1973

3,730,920
COMPOSITIONS CONTAINING MICROSPHERES AND FRICTION ELEMENTS PRODUCED THEREFROM
William J. D'Alessandro, East Brunswick, N.J., assignor to Union Carbide Corporation, New York, N.Y.
Filed Jan. 6, 1972, Ser. No. 215,764
Int. Cl. C08j 1/14; B01j 13/02
U.S. Cl. 260—2.5 B                    13 Claims

ABSTRACT OF THE DISCLOSURE

The disclosure of this application is directed to compositions, containing microspheres, which are especially useful in the production of friction elements, such as automotive brake linings, characterized by excellent service life and which provide excellent brake action. The friction elements of this invention are capable of withstanding severe service conditions as are frequently encountered in the braking of high speed vehicles.

---

Figure 1:
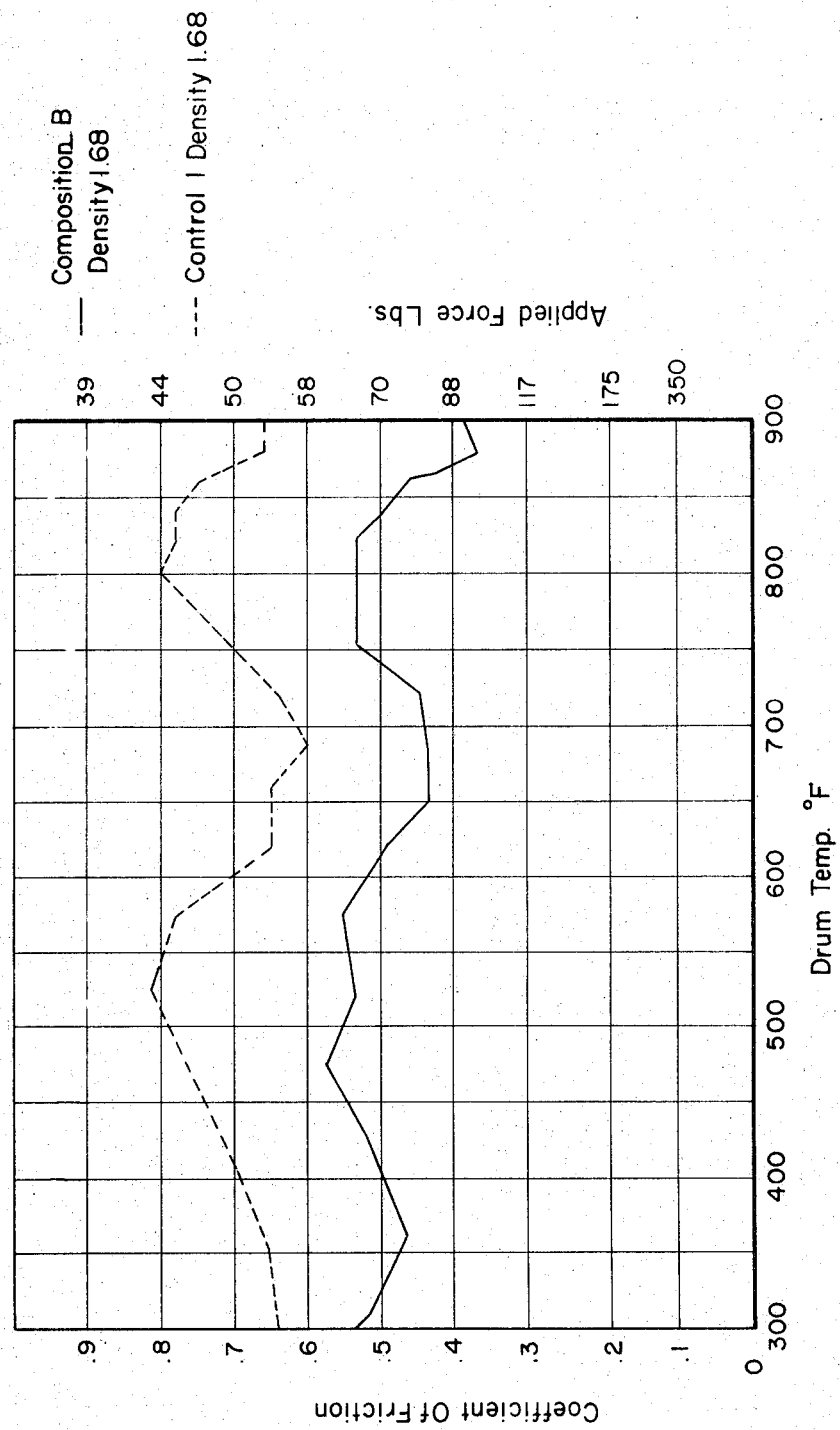

This invention relates to compositions, containing microspheres, which are especially desirable for use in the production of friction elements. More particularly, this invention relates to friction elements, such as automotive brake linings, produced from compositions containing microspheres, which are characterized by excellent service life and which provide excellent brake action. The friction elements of this invention, by reason of their excellent properties, are capable of withstanding severe service conditions as are frequently encountered in the braking of high speed vehicles.

The advent, in ever increasing numbers, of motor vehicles which are larger and have speed capabilities higher than ever before, has made more pressing the necessity of providing each vehicle with an effective braking system; that is, a braking system in which the brake lining will maintain an effective braking action even through the development of relatively high temperatures. Development of relatively high temperatures occurs upon prolonged engagement of the brake lining with the brake drum or brake disc.

Linings of current day braking systems are generally produced by molding or otherwise forming into appropriately shaped articles, compositions comprising a thermosetting resin, which serves as a binder, and so-called friction particles which provide friction characteristics and strength to the linings or friction elements.

One of the deficiencies of current day braking systems having friction elements, as described above, has been the tendency of such systems to lose their effectiveness. That is, these systems have been characterized by an inability to maintain a reasonably constant, high level of friction, expressed in terms of "coefficient of friction" during repeated and prolonged application of the brakes, while providing an acceptable level of wear resistance.

The present invention provides compositions which are particularly desirable for use in the production of friction elements characterized by excellent service life, i.e. resistivity to wear and which provide excellent brake action, as evidenced by a relatively stable and high coefficient of friction. Furthermore, the friction elements of this invention tend to reduce the noise factor of the braking system when the brakes are applied, resist thermal penetration which results in reduced thermal degradation, are characterized by excellent dimensional stability and tend to resist water and oil absorption thus providing improved brake action under "wet" conditions.

The frictional elements of the present invention are based on compositions comprising a thermosetting resin binder, friction particles and microspheres in an amount sufficient to improve the friction characteristics of the compositions.

Figure 2:
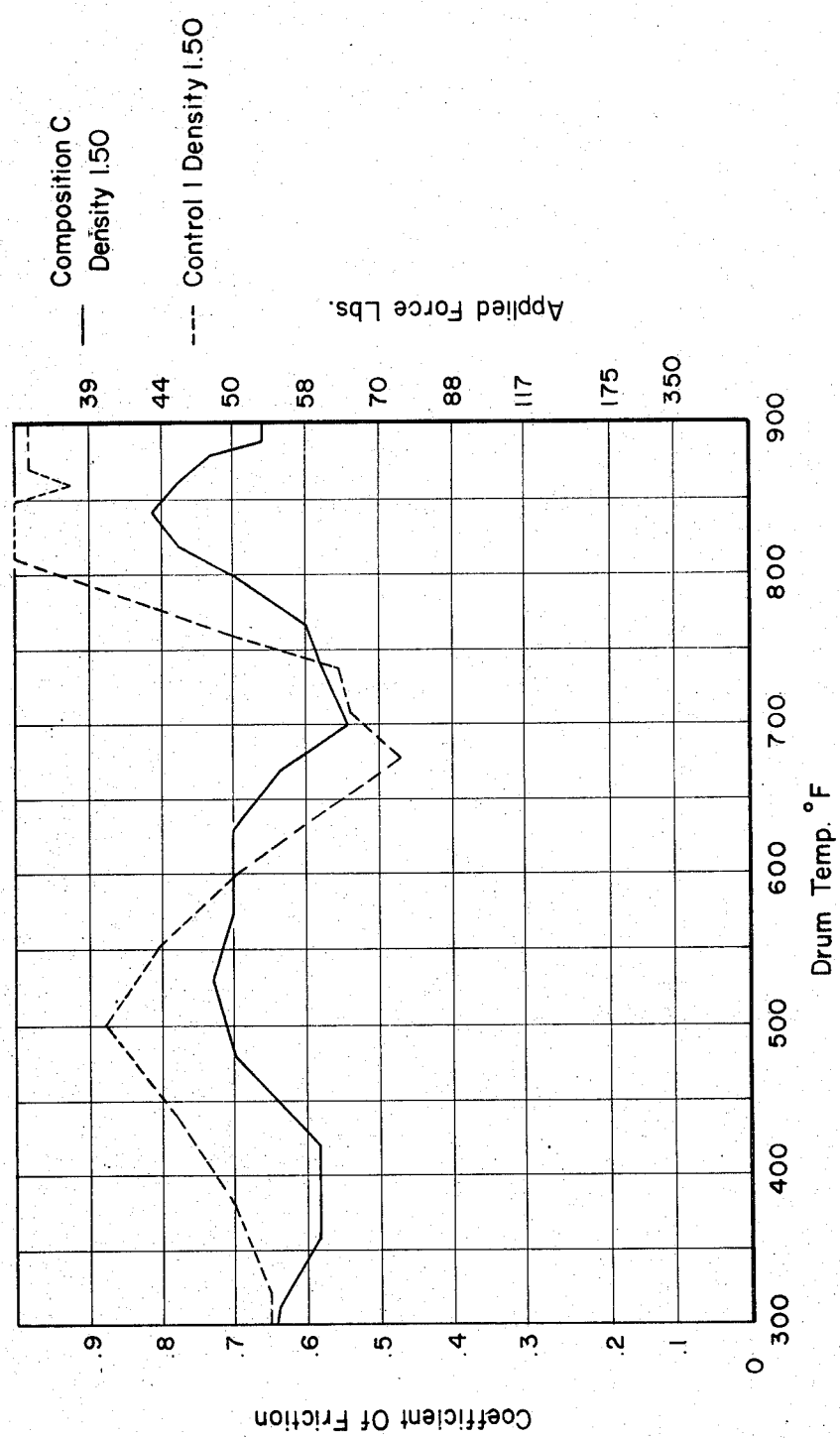

In the drawings:

FIGS. 1 and 2 are graphs showing the test performance of friction elements of the present invention relative to coefficient of friction.

Microspheres, which are used in conjunction with a thermosetting resin binder and friction particles, are products, well known in the art, produced from inorganic and organic materials.

Illustrative of materials from which suitable microspheres can be produced are organic materials such as thermoplastic and thermosetting resins. Among suitable thermoplastic resins can be noted the following: vinyl resins such as poly(vinylalcohol), poly(vinylchloride), poly(vinylbutyral), poly(vinylidene chloride), polystyrene, copolymers of vinyl chloride and vinyl acetate, copolymers of vinylidene chloride and acrylonitrile and the like; acrylic resins such as poly(methyl methacrylate) and the like; resins based on α-olefins such as polyethylene and the like; polyhydroxyether resins described in the J. Wynstra et al. Pat. U.S. 3,305,528 patented Feb. 21, 1967; polysulfone resins described in my U.S. Pat. 3,455,-868 patented July 15, 1969; polyamide resins and the like. Also suitable are materials such as cellulose acetate, cellulose acetate-butyrate, cellulose propionate and the like.

Illustrative of suitable thermosetting resins are the phenolic resins such as phenol-formaldehyde resins and the like; formaldehyde resins such as urea-formaldehyde, melamine-formaldehyde and the like; alkyd resins; polysiloxane resins; epoxy resins and the like.

Inorganic materials, as previously stated, can be used in producing microspheres which are suitable for purposes of the present invention. Examples of suitable inorganic materials are silicates, polyborates, polyphosphates, ceramics and the like. In addition, microspheres produced from carbon, are also suitable as are the metal and metal coated microspheres described in U.S. Pat. 3,264,073 to C.R. Schmitt patented Aug. 2, 1966.

Methods for the production of microspheres are described in U.S. Pat. 3,264,073 and in U.S. Pat. 2,797,201 to F. Veatch et al. patented June 25, 1957.

Friction particles which are used in conjunction with a binder and microspheres to produce the compositions of this invention are heat-resistant materials or a mixture of materials which provide the compositions and consequently the friction elements produced therefrom with an acceptable coefficient of friction when applied against a surface without substantially cutting or wearing away the surface.

Examples of friction particles are filamentous material such as inorganic fibers exemplified by asbestos fibers, steel wool fibers, bronze fibers, glass fibers and the like; organic fibers, such as cellulosic fibers, polyacrylonitrile fibers and the like rendered infusible by a heat-treatment. Particularly desirable filamentous materials are the asbestos fibers described in detail in my U.S. Pat. 3,455,868. Other suitable heat-resistant materials are granular materials such as barium sulfate, cork dust, silica, mica, metal particles, clay, litharge, calcium oxide, zinc oxide, zinc dust, graphite, molybdenum disulfide, iron oxide, Cardolite resins which are reaction products of an aldehyde and cashew nut shell oil described in detail in U.S. Pat. 2,317,587, and the like.

Organic binders which are generally employed in compositions to be used in the production of friction elements are thermosetting resins such as the arylimide resins described in my copending application Ser. No. 199,444 filed Nov. 17, 1971, now abandoned, and entitled Thermosetting Friction Compositions and Friction Elements Thereof; polyepoxides described in U.S. Pat. 3,546,169 to L. F. Cole patented Dec. 8, 1970; polyesters described in detail in U.S. Pat. 2,957,843 to R. S. Anderson et al. patended Oct. 25, 1960; phenolic resins described in detail in my U.S. Pat. 3,455,868 as well as the oil modified phenolic resins produced by condensing a mixture containing a phenol, an aldehyde and a drying oil such as linseed oil, tung oil, castor oil, soybean oil and the like. To the heat-resistant thermosetting resins can be added thermoplastic resins and the resultant composition used as a binder as disclosed in my U.S. Pat. 3,455,868.

The organic binder is used in amounts sufficient to bind together, into a unitary mass, the friction particles and microspheres. The actual amount used will vary and depend, in part, upon the amount and type of friction particles and microspheres used. As a general rule, the amount of binder used varies from about 5 to about 49 percent by weight and preferably about 10 to about 25 percent by weight based on the weight of the total composition, i.e. organic binder, friction particles and microspheres.

As previously stated, the amount of microspheres used is sufficient to improve the frictional characteristics of the compositions. As a rule, the amount varies from about 0.1 to about 30 percent by weight and preferably about 0.2 to about 15 percent by weight based on the weight of the total composition.

Mixing of the components to provide the compositions of this invention can be carried out by a "wet" process as described in my U.S. Pat. 3,455,868 or by a so-called "dry" process in which the components are placed in a mixing container and thoroughly admixed by means of a paint shaker.

The compositions of this invention can be molded into friction elements by conventional techniques as, for example, are described in detail in the examples of this specification. The friction elements can be used as clutch facings and as brake linings in heavy duty cranes, elevators, and vehicles of all types including automobiles, airplanes, railroad cars and the like.

It is to be understood that the disclosure of all patents noted are incorporated herein by reference. Also, mixtures of materials noted can be used, if so desired.

A number of compositions were prepared, molded into plaques and specimens therefrom tested as to brake action and service life. Each composition tested was prepared by placing the components thereof in a container having a friction top which contained 3 rubber stoppers, the rubber stoppers aiding in mixing of the materials and minimizing fiber breakdown. Each container was then thoroughly agitated in a paint shaker. Thereafter, each composition, in an amount sufficient to provide the desired density in the ultimate molded product, was charged to a semi-positive, fixed volume mold having a mold cavity of about 53 cc. and molded into plaques 2 inches by 6 inches by 5/16 of an inch under the following molding conditions:

| | |
|---|---|
| Molding cycle | 15 minutes. |
| Temperature | 300° F. |
| Pressure | 2,000 p.s.i. |
| Gas venting | After 1, 3, 5 and 7 min. |

Each plaque was post cured according to the following schedule:
4 hours at 300° F.
4 hours at 360° F.

Test specimens, one inch by one inch by ¼ of an inch in thickness, were cut from each plaque and tested as to coefficient of friction and wear resistance. Testing was conducted using a high output friction test machine manufactured by Greening Associates of Detroit, Mich. The machine has a rotating metal test drum and a variable speed drive motor for driving the test drum. A thermocouple mounted between the test drum and the variable speed motor measured the temperature of the drum, which in turn was controlled by external heaters and forced air cooling. The instrument panel of the machine recorded the temperature of the drum, the frictional force developed between the rotating drum and the test specimen which was held stationary, and the applied force.

Prior to testing, the surface of the rotating drum was cleaned and finished with No. 320 grit sandpaper. Also, each test specimen was held against the surface of the rotating drum, which was rotating at 15 feet per second and maintained at a temperature of 200° F., until the surface of each specimen was smooth. Each test specimen was then weighed, measured as to its thickness and tested.

The test was conducted under the following conditions:

Constant friction force of 35 lbs.
Constant speed of drum: 20 feet per second
Power adsorption: constant at 1.27 H.P.
Duration of test: 19–20 minutes
Temperature of drum: 300° F. to 900° F. (operating at standard SAE–J–661a drum heating rate)

The data obtained was used to determine the coefficient of friction over a temperature range of 300° F.–900° F. The coefficient of friction values were then used to plot the graphs of FIGS. 1 and 2.

After the test, the weight and thickness of each specimen was measured and the service life reported as the average of the percent weight loss and percent loss in thickness. The lower the "percent" the better the service life.

Compositions tested and the test results relative thereto are set forth below. Amounts noted are in parts by weight.

Composition A

| | |
|---|---|
| Asbestos fibers | 60 |
| Barium sulfate | 10 |
| Cardolite NC 111 | 10 |
| Phenol-formaldehyde binder | 19 |
| Phenolic microspheres | 1 |

Composition B

| | |
|---|---|
| Asbestos fibers | 60 |
| Barium sulfate | 10 |
| Cardolite NC 111 | 10 |
| Phenol-formaldehyde binder | 18 |
| Phenolic microspheres | 2 |

Composition C

| | |
|---|---|
| Asbestos fibers | 60 |
| Barium sulfate | 10 |
| Cardolite NC 111 | 10 |
| Phenol-formaldehyde binder | 16 |
| Phenolic microspheres | 4 |

Composition D

| | |
|---|---|
| Asbestos fibers | 59.7 |
| Barium sulfate | 9.9 |
| Cardolite NC 111 | 9.9 |
| Phenol-formaldehyde binder | 18.9 |
| Glass microspheres | 1.6 |

Composition E

| | |
|---|---|
| Asbestos fibers | 59.5 |
| Barium sulfate | 9.8 |
| Cardolite NC 111 | 9.8 |
| Phenol-formaldehyde binder | 17.8 |
| Glass microspheres | 3.1 |

Composition F

| | |
|---|---|
| Asbestos fibers | 58.7 |
| Barium sulfate | 9.7 |
| Cardolite NC 111 | 9.8 |
| Phenol-formaldehyde binder | 15.8 |
| Glass microspheres | 6.0 |

Composition G

| | |
|---|---|
| Asbestos fibers | 60.5 |
| Barium sulfate | 10.1 |
| Cardolite NC 111 | 10.1 |
| Phenol-formaldehyde binder | 19.1 |
| Vinylidene chloride-acrylonitrile resin microspheres | 0.2 |

Composition H

| | |
|---|---|
| Asbestos fibers | 62.0 |
| Barium sulfate | 10.3 |
| Cardolite NC 111 | 10.3 |
| Phenol-formaldehyde binder | 16.7 |
| Vinylidene chloride-acrylonitrile resin microspheres | 0.7 |

Control I

| | |
|---|---|
| Asbestos fibers | 60 |
| Barium sulfate | 10 |
| Cardolite NC 111 | 10 |
| Phenol-formaldehyde binder | 20 |

Asbestos fibers used, purchased from Johns-Manville, had a grade of 7 as graded by the Quebec Screen Test (Ross, J. G.; Canadian Department of Mines Branch No. 707, 50–51 (1931) revised Dec. 1, 1942.)

Cardolite NC 111 is a cashew nut shell liquid-aldehyde condensation product which was heat cured to the infusible state and granulated as described in U.S. Pat. 2,317,587.

Barium sulfate was a powdered material having a mesh size of about 325.

The phenol-formaldehyde binder was a phenol-formaldehyde novolac having an average molecular weight of about 590 and containing 9.1 percent by weight hexamethylenetetramine.

The phenolic microspheres were prepared from a phenol-formaldehyde resin.

Microspheres prepared from a copolymer of vinylidene chloride and acrylonitrile were purchased from Dow Chemical Co. under the designation XD–4519.04.

TABLE I.—TEST RESULTS

| Test specimens | Density, grams/cc. | Percent wear loss |
|---|---|---|
| Composition: | | |
| A | 1.80 | 6.5 |
| B | 1.68 | 9.0 |
| C | 1.50 | 12.5 |
| D | 1.80 | 6.2 |
| E | 1.68 | 9.1 |
| F | 1.50 | 5.0 |
| G | 1.80 | 7.6 |
| H | 1.50 | 13.0 |
| Control I | 1.80 | 9.0 |
| | 1.68 | 13.5 |
| | 1.50 | 22.0 |

The graphs of FIGS. 1 and 2 clearly show that the friction elements of this invention have significantly more stable brake action, that is significantly more stable coefficient of friction, than friction elements of the same density which do not contain any microspheres.

The data used to plot the graphs of FIGS. 1 and 2, which illustrate the present invention, were obtained from friction elements containing phenolic microspheres. Comparable results are obtained using glass microspheres and microballons produced from a vinylidene-chloride-acrylonitrile copolymer in lieu of the phenolic microspheres.

In molding the plaques from which the test specimens were cut, the relationship between the amount charged into the mold and the density of the molded articles produced was as follows:

| Amount of charge for all compositions noted: | Density of molded plaque, grams per cc. |
|---|---|
| 95 grams | 1.80 |
| 89 grams | 1.68 |
| 80 grams | 1.50 |

What is claimed is:

1. An automotive brake lining of a composition comprising a thermosetting resin binder, friction particles and microspheres in an amount sufficient to improve the friction characteristics and service life of said composition.

2. An automotive brake lining as defined in claim 1 wherein the microspheres are present in an amount of about 0.1 to about 30 percent by weight.

3. An automotive brake lining as defined in claim 1 wherein the microspheres are present in an amount of about 0.2 to about 15 percent by weight.

4. An automotive brake lining as defined in claim 1 containing phenolic microspheres.

5. An automotive brake lining as defined in claim 1 containing glass microspheres.

6. An automotive brake lining as defined in claim 1 containing vinylidene chloride-acrylonitrile resin microspheres.

7. An automotive brake lining as defined in claim 1 wherein the binder is a phenol-formaldehyde resin.

8. An automotive brake lining as defined in claim 1 containing asbestos fibers particles.

9. An automotive brake lining as defined in claim 1 containing barium sulfate.

10. An automotive brake lining as defined in claim 1 wherein the binder is present in an amount of about 5 to about 49 percent by weight.

11. An automotive brake lining composition as defined in claim 1 comprising a phenol-formaldehyde binder, asbestos fibers, barium sulfate particles and microspheres wherein the binder is present in an amount of about 5 to about 49 percent by weight and the microballons are present in an amount of about 0.1 to about 30 percent by weight.

12. An automotive brake lining as defined in claim 1 wherein the binder is a phenolic resin or an arylimide resin or a polyepoxide or a polyester.

13. An automotive brake lining as defined in claim 1 wherein the thermosetting binder is a phenolic resin.

References Cited

UNITED STATES PATENTS

| | | | |
|---|---|---|---|
| 3,238,156 | 3/1966 | Kohrn | 260—2.5 B |
| 3,365,358 | 1/1968 | Hutchins | 260—2.5 B |
| 3,316,187 | 4/1967 | Grosner et al. | 260—2.5 B |
| 2,797,201 | 6/1957 | Veatch et al. | 260—2.5 B |
| 2,806,509 | 9/1957 | Bozzacco et al. | 260—2.5 B |
| 3,030,215 | 4/1962 | Veatch et al. | 260—2.5 B |
| 3,267,048 | 4/1966 | Horste et al. | 260—2.5 F |
| 3,455,866 | 7/1969 | D'Alesandro | 260—Dig. 39 |

SAMUEL H. BLECH, Primary Examiner

M. FOELAK, Assistant Examiner

U.S. Cl. X.R.

188—251 R, 251 A; 260—Dig. 39

UNITED STATES PATENT OFFICE
CERTIFICATE OF CORRECTION

Patent No. 3,730,920  Dated May 1, 1973

Inventor(s) W. J. D'Alessandro

It is certified that error appears in the above-identified patent and that said Letters Patent are hereby corrected as shown below:

Change the title to read: --Automotive Brake Lining Of Compositions Containing Microspheres--

Column 3, line 3; "patended" should read --patented--

Column 5, line 64; "microballons" should read --microspheres--

Column 6, line 41; "microballons" should read --microspheres--

Signed and sealed this 20th day of November 1973.

(SEAL)
Attest:

EDWARD M. FLETCHER, JR.
Attesting Officer

RENE D. TEGTMEYER
Acting Commissioner of Patents